(12) United States Patent
Reid et al.

(10) Patent No.: US 11,023,365 B2
(45) Date of Patent: Jun. 1, 2021

(54) SYSTEMS AND METHODS FOR AUTOMATED PROVISIONING OF A VIRTUAL MAINFRAME TEST ENVIRONMENT

(71) Applicant: THE TORONTO-DOMINION BANK, Toronto (CA)

(72) Inventors: Scott Alexander Reid, London (CA); Kenneth Leonard Gaudreau, London (CA); Mohamed Tanvir Mohamedraza Kara, Richmond Hill (CA); Daniel T. Kolenko, Komoka (CA)

(73) Assignee: THE TORONTO-DOMINION BANK, Toronto (CA)

( * ) Notice: Subject to any disclaimer, the term of this patent is extended or adjusted under 35 U.S.C. 154(b) by 0 days.

(21) Appl. No.: 16/577,439

(22) Filed: Sep. 20, 2019

(65) Prior Publication Data

US 2021/0089437 A1    Mar. 25, 2021

(51) Int. Cl.
*G06F 11/36* (2006.01)
*H04L 29/06* (2006.01)

(52) U.S. Cl.
CPC ...... *G06F 11/3688* (2013.01); *G06F 11/3664* (2013.01); *G06F 11/3684* (2013.01); *H04L 63/20* (2013.01)

(58) Field of Classification Search
USPC ...................................................... 717/124
See application file for complete search history.

(56) References Cited

U.S. PATENT DOCUMENTS 8,549,522 B1    10/2013  Chatterjee et al.
9,110,496 B1 *   8/2015  Michelsen ......... G06F 9/45558
(Continued)

OTHER PUBLICATIONS

Versteeg et al.; "Emulation of Cloud-Scale Environments for Scalability Testing"; IEEE 12th International Conference on Quality Software(QSIC 2012); 2012 (Year: 2012).*
(Continued)

*Primary Examiner* — Wei Y Zhen
*Assistant Examiner* — Clint Thatcher

(57) ABSTRACT

There is provided a computer-implemented method and system for provisioning a virtual development and test environment for testing a mainframe computer, comprising: obtaining an indication of a software change to an application on the mainframe computer; receiving a request, from a requesting device, for testing the software change. Said method and system further comprises, in response to the request: receiving, from the mainframe computer, configuration data characterizing the software change and characterizing the application; automatically provisioning, using the configuration data, an instance of a virtual testing environment for the mainframe on a cloud network for testing the application; and, based on the configuration data, automatically providing one or more test scripts to the virtual testing environment for testing the software change to the application on the virtual environment, the one or more test scripts further generated based on automatically determining from the configuration data, a set of prior test scripts implemented for another application similar to the application and having a previously implemented software change.

20 Claims, 3 Drawing Sheets

(56) References Cited

U.S. PATENT DOCUMENTS

| | | | |
|---|---|---|---|
| 2009/0249284 A1* | 10/2009 | Antosz | H04L 41/5054 |
| | | | 717/104 |
| 2010/0192220 A1* | 7/2010 | Heizmann | G06F 21/6254 |
| | | | 726/19 |
| 2014/0129611 A1 | 5/2014 | Norris et al. | |
| 2014/0282434 A1* | 9/2014 | Eilam | G06F 11/3664 |
| | | | 717/131 |
| 2015/0135168 A1 | 5/2015 | Padmanabhan et al. | |
| 2015/0199212 A1 | 7/2015 | Acheff et al. | |
| 2015/0331689 A1 | 11/2015 | Blahaerath et al. | |
| 2015/0339216 A1 | 11/2015 | Wade | |
| 2016/0173572 A1* | 6/2016 | Chan | H04L 43/50 |
| | | | 709/225 |
| 2016/0378627 A1 | 12/2016 | Lange et al. | |
| 2019/0034320 A1* | 1/2019 | Stokes | G06F 11/3692 |
| 2019/0065351 A1* | 2/2019 | Rakhmilevich | G06F 11/3692 |
| 2020/0285569 A1* | 9/2020 | Tung | G06F 11/3684 |

OTHER PUBLICATIONS

Luis Carlos Silva; "The Unbearable Lightness of Being: Mainframe on the Cloud"; IBM.com blog website [full url in ref.]; Jul. 15, 2019 (Year: 2019).*

King, Stan H. "zPDT & zDT Technology Presentation and Fact Finding", Information Technology Company LLC, 2018 VM Workshop dated Jun. 28-30, 2018. http://www.vmworkshop.org/2018/present/zpdttech.pdf. 22 pages.

* cited by examiner

SYSTEMS AND METHODS FOR AUTOMATED PROVISIONING OF A VIRTUAL MAINFRAME TEST ENVIRONMENT

TECHNICAL FIELD

The present disclosure generally relates to computer-implemented systems and methods for automated testing of mainframe computers in a virtual mainframe test environment.

BACKGROUND

Generally, mainframe test environments are a critical component for application development and testing. Currently, in order to test changes to applications within the mainframe environment (e.g. mainframes using IBM's z/OS operating systems), a dedicated physical hardware environment is used and such changes are manually tested (e.g. via a user providing input such as via a keyboard to manually key in various user customized test procedures). Such testing also requires manual co-ordination and/or verification between multiple physical test environments and/or applications. Such manual testing processes can be time consuming and costly to maintain the physical mainframe testing system and not feasible for scalability as the number of changes to be tested increases.

SUMMARY

It is to be understood that both the foregoing general description and the following detailed description are exemplary and explanatory only and are not restrictive of the claims.

In one aspect, there is provided a testing manager computing device for providing a virtual development and test environment for testing a mainframe computer, comprising: a storage device storing instructions; and at least one processor in communication with the storage device and configured to execute the instructions to: obtain an indication of a software change to an application on the mainframe computer; receive a request, from a requesting device, for testing the software change; in response to the request: receive, from the mainframe computer, configuration data characterizing the software change and characterizing the application; automatically provision, using the configuration data, an instance of a virtual testing environment for the mainframe on a cloud network for testing the application; and based on the configuration data, automatically provide one or more test scripts to the virtual testing environment for testing the software change to the application on the virtual environment, the one or more test scripts further generated based on automatically determining from the configuration data a set of prior test scripts implemented for another application similar to the application and having a previously implemented software change.

In another aspect, there is provided a computer-implemented method for provisioning a virtual development and test environment for testing a mainframe computer, comprising: obtaining an indication of a software change to an application on the mainframe computer; receiving a request, from a requesting device, for testing the software change; in response to the request: receiving, from the mainframe computer, configuration data characterizing the software change and characterizing the application; automatically provisioning, using the configuration data, an instance of a virtual testing environment for the mainframe on a cloud network for testing the application; and based on the configuration data, automatically providing one or more test scripts to the virtual testing environment for testing the software change to the application on the virtual environment, the one or more test scripts further generated based on automatically determining from the configuration data a set of prior test scripts implemented for another application similar to the application and having a previously implemented software change.

In yet another aspect, there is provided a non-transitory computer readable medium storing instructions data for provisioning a virtual development and test environment for virtual testing a mainframe computer, which when executed by a processor of a computing device, the processor coupled to a memory and to a input/output (I/O) device, configure the computing device to: obtain an indication of a software change to an application on the mainframe computer; receive a request, from a requesting device, for testing the software change; in response to the request: receive, from the mainframe computer, configuration data characterizing the software change and characterizing the application; automatically provision, using the configuration data, an instance of a virtual testing environment for the mainframe on a cloud network for testing the application; and based on the configuration data, automatically provide one or more test scripts to the virtual testing environment for testing the software change to the application on the virtual environment, the one or more test scripts further generated based on automatically determining from the configuration data a set of prior test scripts implemented for another application similar to the application and having a previously implemented software change.

These and other aspects will be apparent including computer program products that store instructions in a non-transitory manner (e.g. in a storage device) that, when executed by a computing device, configure the device to perform operations as described herein.

Further features of the disclosed systems and methods and the advantages offered thereby, are explained in greater detail hereinafter with reference to specific embodiments illustrated in the accompanying drawings.

DESCRIPTION OF THE EMBODIMENTS

Reference will now be made in detail to embodiments of the present disclosure, examples of which are illustrated in the accompanying drawings. Wherever possible, the same reference numbers will be used throughout the drawings to refer to the same or like parts.

Mainframe applications which run on traditional legacy server architectures are typically complex to test as they often spread across multiple systems and have many interdependent parts. Testing of mainframe application changes requires time and resources to be manually set up and different customized tests are typically manually developed to test different parts of the application which need to be coordinated. Additionally, it can be difficult to provide developers access to testing resources that directly access the physical mainframe environment such as to allow development and subsequent testing of the developed applications.

It would be desirable to provide new and improved systems and methods for testing application(s) on a virtual test environment.

It would therefore be desirable, as presented in one or more disclosed embodiments, to provide such mainframe testing within a virtual (cloud-based) environment such as to allow multiple test environments to be set up dynamically and automatically in real-time rather than the cumbersome and costly task of manually devising physical test environments which need to be built and maintained by a large development team.

In order to overcome at least some of the above-mentioned challenges, the disclosed system and method provides a virtual mainframe test environment wherein, a testing manager automatically retrieves metadata (e.g. configuration data for a mainframe application to be tested) from the mainframe computer and processes it to automatically provision a virtual mainframe environment thereby providing cloud-based instances for the virtual mainframe application and virtual mainframe database in the virtual environment. Additionally, the testing manager is configured to analyze the configuration data in accordance with pre-defined scripts and based on prior mainframe testing performed on other associated/related applications having a similar software change (e.g. applications being determined as associated to the current application to be tested by machine learning classification techniques) to automatically generate test scripts for testing the virtual mainframe application on the virtual mainframe environment.

Figure 1:
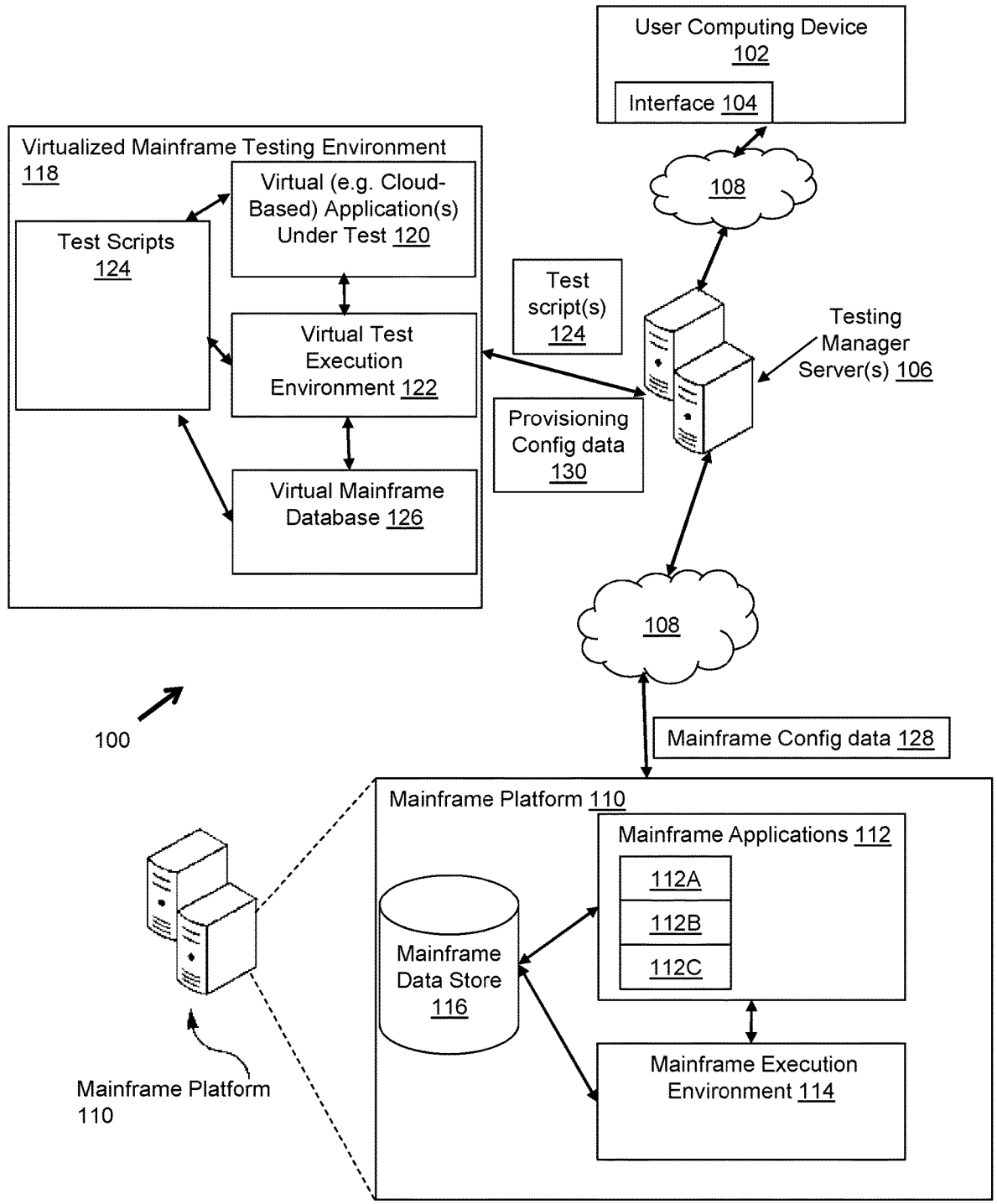
FIG. 1 depicts an example computing environment network configured to provide automated provisioning capability of virtualized mainframe test environments, in accordance with one or more disclosed embodiments.

FIG. 1 is a diagram illustrating an example computer network 100 for virtualizing and automating process for mainframe test environments. In the computer network environment 100, a requesting device such as an example user computing device 102, communicates via an interface 104 such as a web browser and/or a software application, on the device 102, with testing manager server(s) 106, using one or more communication networks 108, to request automated self-service testing and provisioning of virtual environment for a mainframe platform 110. The testing manager server 106 is a mainframe emulator particularly configured for automating processes for virtual mainframe test environments. The testing manager server 106 is configured to emulate mainframe computing resources, such as computer software including mainframe applications, user interfaces, connected peripheral resources, mainframe operating systems, etc.

An example mainframe emulator currently known is zDT or zPDT which is a Linux app that executes z Systems instructions. Such systems are limited in their capabilities and are manually controlled emulators which are manually configured by developers.

Generally, the computer network environment 100 provides one or more virtual testing environments (e.g. 118), each having a virtual mainframe database 126 which is preferably an isolated database comprising security manager information (e.g. security access information for the mainframe including user login information and other authentication information). Because the database 126 runs in the cloud (could be public or private) the risk of "exposing" security information such as logon ids and passwords through security threats is minimized. The virtual mainframe database 126 is thus an isolated database having details for the mainframe platform 110 (e.g. containing security management info such as login information for accounts) with no link to the current mainframe environment (e.g. mainframe platform 110), and the non-personal id information for logins are designed for testing specific id's (e.g. system admin or test admin login ids).

Furthermore, current physical mainframe testing systems are cumbersome and inefficient as they require a full build of each testing environment. The virtual testing environment 118 of FIG. 1 uses a copy of a configured blueprint which enables scaling of environments without a full build for each testing environment. In this manner, further computing speed and development ease efficiencies are obtained via the network 100 in FIG. 1. Further, specific portions of the configuration (e.g. test data which can be provided in test scripts 124) in FIG. 1 can be overwritten or altered dynamically without manually needing to reload the data which is time consuming and inefficient.

As can be envisaged by a skilled person, there is a finite ability to build physical mainframe environments for testing which is tied to resources (both human and infrastructure) compared to virtual mainframe test environments. In existing physical mainframe testing environments, both the size of the current team that builds/maintains physical environments and the associated mainframe infrastructure needs to be scaled, which is not possible. The computer network 100 in FIG. 1 provides a virtual mainframe testing environment 118 that does not have such a constraint with scalability.

Mainframe platform 110 may comprise one or more servers that run on the mainframe platform 110 under the z/OS operating system. Mainframe platform 110 uses a programming language such as COBOL.

Referring again to FIG. 1, such request for testing may be in response to the testing manager server(s) 106 and/or the user computing device 102 receiving an indication that a software change has occurred on the mainframe platform (e.g. a change to an existing mainframe application or a new mainframe application added) which requires testing against pre-defined and/or automatically generated test cases. Simplified components of the mainframe platform 110 are illustrated in FIG. 1, which can comprise mainframe applications 112A, 112B, 112C (collectively 112), in communication with a mainframe data store 116 and a mainframe execution environment 114 having one or more processors for maintaining and executing said applications 112.

The mainframe execution environment 114 may be configured to run mainframe operating systems such as z/OS. As an example, operating system Z/OS is a 64-bit operating system (OS) developed by IBM™ for its family of z/Architecture enterprise mainframe computers, including the zEnterprise 196 and zEnterprise 114. Z/OS is an operating system based on the 64-bit z/Architecture. Other mainframe operating systems can be envisaged such as, z/VM, z/VSE, Linux, Linux on Z, and z/TPF.

The request from user computing device 102 causes the testing manager server 106 to communicate across one or more communication networks 108 with one or more computing devices (e.g. including user computing device 102, the mainframe platform 110) to automatically provision a virtualized mainframe testing environment 118 on the cloud. The virtualized mainframe testing environment 118 is preferably a secured, private cloud computing environment which comprises compliance and/or security standards in a virtual mainframe database 126. The virtualized mainframe testing environment 118 further comprises virtual (e.g. cloud-based) application(s) under test 120, a virtual test execution environment 122 (e.g. comprising one or more processors) and a set of test scripts 124. As illustrated in FIG. 1, the testing manager server(s) 106 is configured, in response to the request for testing, to request and receive mainframe configuration data 128, from the mainframe platform 110. The mainframe configuration data 128 contains metadata identifying and characterizing the software change to the mainframe platform 110 and characterizing the application to be tested (e.g. application 112A) and affected by the software change.

An example type of information needed from the mainframe platform 110 for provisioning the virtual mainframe testing environment 118 can include but is not limited to, Base System Residence (SYSRES) components that incorporate specific customization data for the testing environment (e.g. 118). SYSRES is a set of system residence volumes and refers to the disk volumes that contain the operating system, e.g. z/OS software. The data sets provided on the SYSRES data components containing testing information also provides the information for the test scripts 124 required for testing the virtual applications 120 in the virtualized mainframe testing environment 118.

The testing manager server 106 thereby uses the mainframe configuration data 128 to create an instance of a virtualized mainframe testing environment 118 for the mainframe on a cloud network for testing the application. For example, the virtualized mainframe testing environment 118 analyzes the mainframe configuration data 128 to automatically provide one or more test scripts 124 to the virtualized testing environment 118 for testing the software change to the virtual application under test 120 on the virtualized mainframe testing environment 118. The test scripts 124 are generated based on automatically determining from the mainframe configuration data 128, a set of prior test scripts implemented for another application similar to the application and having a previously implemented software change. The testing manager server 106 may also provide metadata having provisioning configuration data 130 for automatically building the virtual applications under test 120 and/or test scripts 124 and/or virtual mainframe database 126 via the virtual test execution environment 122. Accordingly, such automated provisioning allows deployment of the virtualized mainframe test environment (e.g. to run on a private cloud) using pre-defined procedures (e.g. as provided in the provisioning configuration data 130) that are carried out electronically without human intervention.

In at least some embodiments, the testing manager server 106 is further configured to use the mainframe configuration data 128 to determine related applications (e.g. applications 112B, 112B affected by the change for testing) and a mainframe database (e.g. mainframe data store 116) affected by the software change and automatically provision the virtualized mainframe testing environment 118 to automatically provide virtual cloud-based instances of each of the application (e.g. 112A via virtual applications), the related applications (e.g. 112fi) affected by the software change via virtual application(s) under test 120 and the mainframe data store 116, via the virtual mainframe database 126. In at least some aspects, the related applications (e.g. 112B, 112C) comprise applications which send or receive data to the application or otherwise cooperate with the application (e.g. 112A) having the software change.

Accordingly, the virtualized mainframe testing environment 118 enables agility of testing, improved efficiency and DevOps for mainframe application development. Thus, the automated generation and provisioning or deployment of the virtualized mainframe testing environment 118, including automatically generating test scripts for corresponding detected application changes on the mainframe allows developers to rapidly prototype new mainframe applications (e.g. 112A-112C) for automatic testing and validation by the system 100 in a virtualized environment. Additionally, the virtualized mainframe testing environment 118 allows mainframe resources for higher environments to be freed up. Furthermore, in at least some embodiments, the virtualized mainframe testing environment 118 provided by the network 100 of FIG. 1 can be used as a test bed for new software tooling, training of new system operators, and testing of z/OS components without impacting the existing mainframe environment (e.g. mainframe platform 110).

The virtualized mainframe testing environments 118 provided by the network 110 may also be used as sandboxes to enable new resources ramp up on knowledge of the mainframe environments (e.g. mainframe platform 110). Current physical mainframe testing environments require manual development and are limited as they can't create testing environments to provide to each new resource for testing. In at least some embodiments, dedicated virtual environment, e.g. 118, can be provided to each resource for testing (net new or existing).

Further, although not shown, the components of the virtualized mainframe test environment 118 (e.g. test scripts 124, virtual application(s) under test 120, virtual mainframe database 126) stored on the cloud can be accessed by external computing devices (e.g. user computing device 102) using a web services application programming interface (API) or by applications accessing the API.

It is understood that representative communication network 108 is simplified for illustrative purposes. Additional networks may also be coupled to communication network 108 such as a wireless network (not shown) between communication network 108 and user computing device 102.

It will be understood that, in some embodiments, user computing device 102 may not communicate directly with the testing manager server(s) 106 performing the automated provisioning of a virtualized mainframe testing environment (118) per se but may communicate with a server configured to receive and initially handle requests from the user computing device 102 (e.g. a mobile processing server), a Web server or other type of server. To complete the automated provisioning of a virtualized mainframe testing environment 118, user computing device 102 may communicate with more than one server (e.g. more than one testing manager server(s) 106). Other configurations are also known to those skilled in the art.

Figure 2:
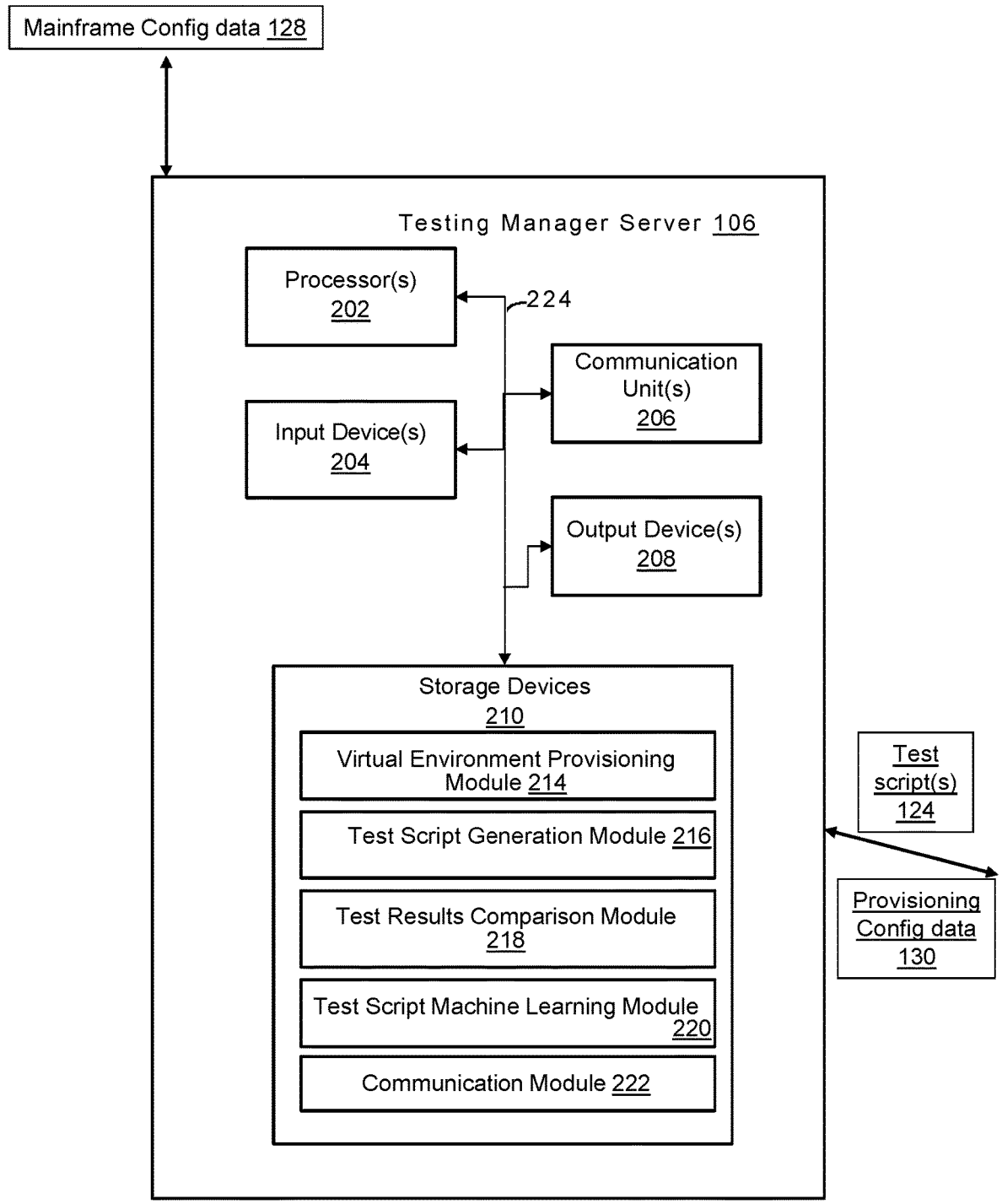
FIG. 2 depicts an example testing manager server for use with the mainframe of FIG. 1 for automatically provisioning a virtual test environment and automatically providing test script(s) for testing virtual mainframe application(s), in accordance with one or more disclosed embodiments.

FIG. 2 shown is a diagram illustrating in block form an example computing device (e.g. testing manager server 106), in accordance with one or more aspects of the present disclosure, for example, to automatically provide a virtual mainframe test environment (e.g. virtualized mainframe testing environment 118, including components such as cloud instances of the applications under test, the virtual test execution environment, and the virtual mainframe database). The testing manager server 106 automatically generates relevant test scripts and data to enable automated testing. Testing manager server 106 comprises one or more processors 202, one or more input devices 204, one or more communication units 206 and one or more output devices 208. Testing manager server 106 also includes one or more storage devices 210 storing one or more modules such as virtual environment provisioning module 214, test script generation module 216, test results comparison module 218, test script machine learning module 220 and communication module 222. Communication channels 224 may couple each of the components 202, 204, 206, 208, 210, 214, 216, 218, 220 and 222 for inter-component communications, whether communicatively, physically and/or operatively. In some examples, communication channels 224 may include a system bus, a network connection, an inter-process communication data structure, or any other method for communicating data.

One or more processors 202 may implement functionality and/or execute instructions within the testing manager server 106. For example, processors 202 may be configured to receive instructions and/or data from storage devices 210 to execute the functionality of the modules shown in FIG. 2, among others (e.g. operating system, applications, etc.). Testing manager server 106 may store data/information to storage devices 210. Some of the functionality is described further herein below.

One or more communication units 206 may communicate with external devices such as mainframe platform 110, virtualized mainframe testing environment 118 and user computing device 102, etc. via one or more networks (e.g. 108) by transmitting and/or receiving network signals on one or more of the networks. The communication units may include various antennae and/or network interface cards, etc. for wireless and/or wired communications.

Input and output devices may include any of one or more buttons, switches, pointing devices, cameras, a keyboard, a microphone, one or more sensors (e.g. biometric, etc.) a speaker, a bell, one or more lights, etc. One or more of same may be coupled via a universal serial bus (USB) or other communication channel (e.g. 224).

The one or more storage devices 210 may store instructions and/or data for processing during operation of testing manager server 106. The one or more storage devices 210 may take different forms and/or configurations, for example, as short-term memory or long-term memory. Storage devices 210 may be configured for short-term storage of information as volatile memory, which does not retain stored contents when power is removed. Volatile memory examples include random access memory (RAM), dynamic random access memory (DRAM), static random access memory (SRAM), etc. Storage devices 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Communication module 222 may be configured to obtain mainframe configuration data 128 to instruct the virtual environment provisioning module 214. Virtual environment provisioning module 214 cooperates with communication module 222 to obtain information, from the mainframe platform, via the mainframe configuration data 128, relating to the software change to be tested, mainframe application(s) 112 having the software change, and stored mainframe data affected by the software change. Note that the mainframe configuration data 128 may be provided iteratively as the testing manager 106 and/or mainframe platform 110 cooperate to determine which application(s) on the mainframe are affected by the proposed software change to be tested.

For example, the software change may be a new mainframe application, changes to an output interface for an existing mainframe application, changes to data storage in the mainframe data store, etc.

Based on the mainframe configuration data 128, the virtual environment provisioning module 214 determines the applications, data and execution environment affected by the software change and automatically provisions a virtualized mainframe testing environment 118 (see FIG. 1) which includes generating virtual instances of mainframe applications (e.g. 120) and/or virtual mainframe databases (e.g. 126) and/or corresponding virtual test execution environment processes (e.g. 122) affected by or directly involved with the mainframe software change to be tested. The virtual environment provisioning module 214 may also provide to the cloud, provisioning configuration data 130 generated based on the mainframe configuration data 128, for generating and/or configuring the virtualized mainframe testing environment 118.

Additional types of mainframe configuration and provisioning data 128 retrieved from the mainframe platform 110 can include but not limited to: customization metadata (e.g. from sources internal or external to the organization) for building of any of the mainframe related data, or metadata for stopping/starting information management system (IMS) database regions for the mainframe platform 110 or any other supporting metadata to allow a developer independent and automated testing. The configuration data 128 may thus be used to support configuration for testing efforts and automatically provisioning the virtual mainframe testing environment 118.

Test script generation module 216 is configured to process the mainframe configuration data 128 to automatically determine and provide one or more test scripts to the virtualized mainframe testing environment 118 for testing the software change to the mainframe application(s) 112.

The test scripts 124 are configured to test and/or determine that the modified mainframe application(s) having the software change (e.g. 112A in FIG. 1) meet a set of predefined requirements for the application(s) and the mainframe platform 110 (e.g. maintaining compliance and security protocol standards). Additionally, the test scripts (e.g. 124 in FIG. 1) automatically generated by the testing manager server 106 may be a combination of test processes automated to occur in a specific order, and configured to test the functionality of the application (e.g. modified application 112A), using various test case scenarios, for the software change mentioned. Such testing order sequence, the combination of test processes selected, the type of mainframe data requested from the mainframe platform 110 to perform virtualized instances for testing of the application, may be based on the test script machine learning module 220 determining which other similar software changes have been tested for a given mainframe platform. This may include determining similar mainframe applications (to the current mainframe application having a software change) that were previously tested and retrieving metadata information regarding the corresponding test script sets, and order of execution.

In one example, the test scripts 124 are defined in a computer programming language such as Job Control Language (JCL) which is a scripting language used to define tests for mainframe computing systems.

Specifically, the test script generation module 216 can be configured to determine from the mainframe configuration data 128, metadata information identifying the software change and the mainframe application(s) 112 affected by the change. Based on the identification information for the software change to be tested, the test script generation module 216 may access sets of prior test script(s) 124 implemented for other similar applications to the one being tested. For example, the test script generation module 216 may be configured to listen to and track manual testing (e.g. input via input devices 204) for other applications being tested and store a repository of prior test scripts and corresponding details regarding the software change and/or affected applications. In at least some embodiments, the test script generation module 216 may be configured to tie together in a defined order a set of known various disparate test scripts/processes (e.g. as associated with similar applications previously tested) each associated with a subset of the tasks to be performed for the testing to automatically generate the test script 124. In this manner, the end-to-end testing generation process is automated.

In at least some embodiments, the test scripts generation module 216 generates test scripts 124 which include test processes for validating the application to be tested (e.g. 112A) and the related applications (e.g. 112B, 112C) interacting with the application 112A for functionality of the software change being in compliance with pre-defined requirements.

In at least some embodiments, the test scripts generation module 216 generates test scripts 124 which include test processes for retrieving data (e.g. from data store 116) from the mainframe platform 110 affected by the software change and to validate, via cloud-based instances 120, 122, 126 that a layout and data storage of the retrieved data subsequent to the software change is in compliance with pre-defined requirements. Such comparison can be instructed via the test results comparison module 218.

Additionally, the test script machine learning module 220 may be configured to cooperate with the test script generation module 216 to generate the relevant test script(s) 124 in FIG. 1. Thus the test script machine learning module 220 is configured to determine based on the metadata information identifying the current software change for testing (e.g. extracted from mainframe configuration data 128), related similar application(s) having corresponding software changes which were previously tested. Thus, based on determining the related applications previously tested, the test script generation module 216 retrieves a previously performed test script set for the related applications, automates the processes within the previously performed test script set (e.g. bundles the processes together such that they are to be performed in an order according to pre-defined requirements) and generates the test scripts 124 based on the automated previously performed test script set for related applications.

Accordingly, the cooperation of the test script machine learning module 220 and the test script generation module 216 automatically provides one or more test scripts 124 to the virtualized mainframe testing environment 118 for testing the software change to the application (e.g. application 112A) on the virtualized mainframe testing environment 118 (e.g. as applied to virtual applications under test 120). The one or more test scripts 124 are further generated based on automatically determining from the mainframe configuration data 128, a set of prior test scripts implemented for another application similar to the application and having a previously implemented software change (e.g. via the test script machine learning module 220).

The provisioning configuration data 130 may also comprise security and/or compliance information, which the virtual application(s) under test 120 are to be tested against based on the test scripts 124. The security and/or compliance information for testing may also be retrieved based on first determining prior similar applications having tested software changes by the test script machine learning module 220, and subsequently retrieving the security and/or compliance information associated with the determined similar applications. In another aspect, the security and/or compliance information may be received from the user computing device 102 (see FIG. 1) and/or directly from the mainframe platform 110.

Referring to security standards, in one aspect, subsequent to the indication of the software change received, the testing manager server 106 is configured to request and receive, via the communication module 222, from the mainframe platform 110, mainframe security and network security standards. Based on these standards, the test scripts 124 are further automatically generated to test whether the software change complies with the mainframe security and network security standards.

In at least some embodiment, the testing manager server 106 is configured to request and receive, via the communication module 222, from the mainframe platform 110, compliance standards for testing the software change and the test scripts 124 are further generated to test whether the software change complies with the compliance standards.

In at least some embodiments, the testing manager server 106 is configured to, via the test script generation module 216, identify from the received mainframe configuration data 128, an intended use of the indicated software change by the mainframe platform 110. The generated test scripts 124 are then executed to test the application (e.g. 112A) having the software change on the virtualized mainframe testing environment 118. The testing manager server 106 then requests and receives from the mainframe platform 110 at least one permissioning or compliance policy and conveys such to the virtualized mainframe testing environment 1188 to include in the test scripts 124 for the testing. In response, the virtualized mainframe testing environment 118 provides a result of whether the testing indicates that the intended use is inconsistent with at least one permissioning or compliance policy. In at least some embodiments, the testing manager server 106 then transmits the result to the mainframe platform 110 for preventing the software change to be executed or recommend further changes based on the permissioning or compliance policy, if inconsistent.

Additionally, in at least some embodiments, the test results comparison module 218 may be configured to receive a response from the virtualized mainframe testing environment 118 of FIG. 1 regarding the results of executing the test scripts 124 on the virtual applications under test 120. The test results may be stored directly in a database of the virtualized mainframe testing environment 118 (e.g. 126) or in a database of the testing manager server 106 (e.g. storage 210). Such results may indicate for example, whether the software changes provide the desired functionality, is compatible with the mainframe platform 110 and related mainframe applications 112 and/or meets pre-defined compliance and security standards. The test results comparison module 218 may then be configured to automatically process the test results and determine whether additional testing should be performed. Alternatively, the test results comparison module 218 may be configured to output the results to the user computing device 102 via interface 104 for receiving additional testing constraints. For example, if it is determined that the software change does not meet the desired functionality expected by the software change, then the testing manager server 106 may request additional testing metadata information from either the mainframe platform 110 and/or the user computing device 102 of FIG. 1 for generating additional test scripts 124.

It is understood that operations may not fall exactly within the modules 214-222 of FIG. 2 such that one module may assist with the functionality of another.

Figure 3:
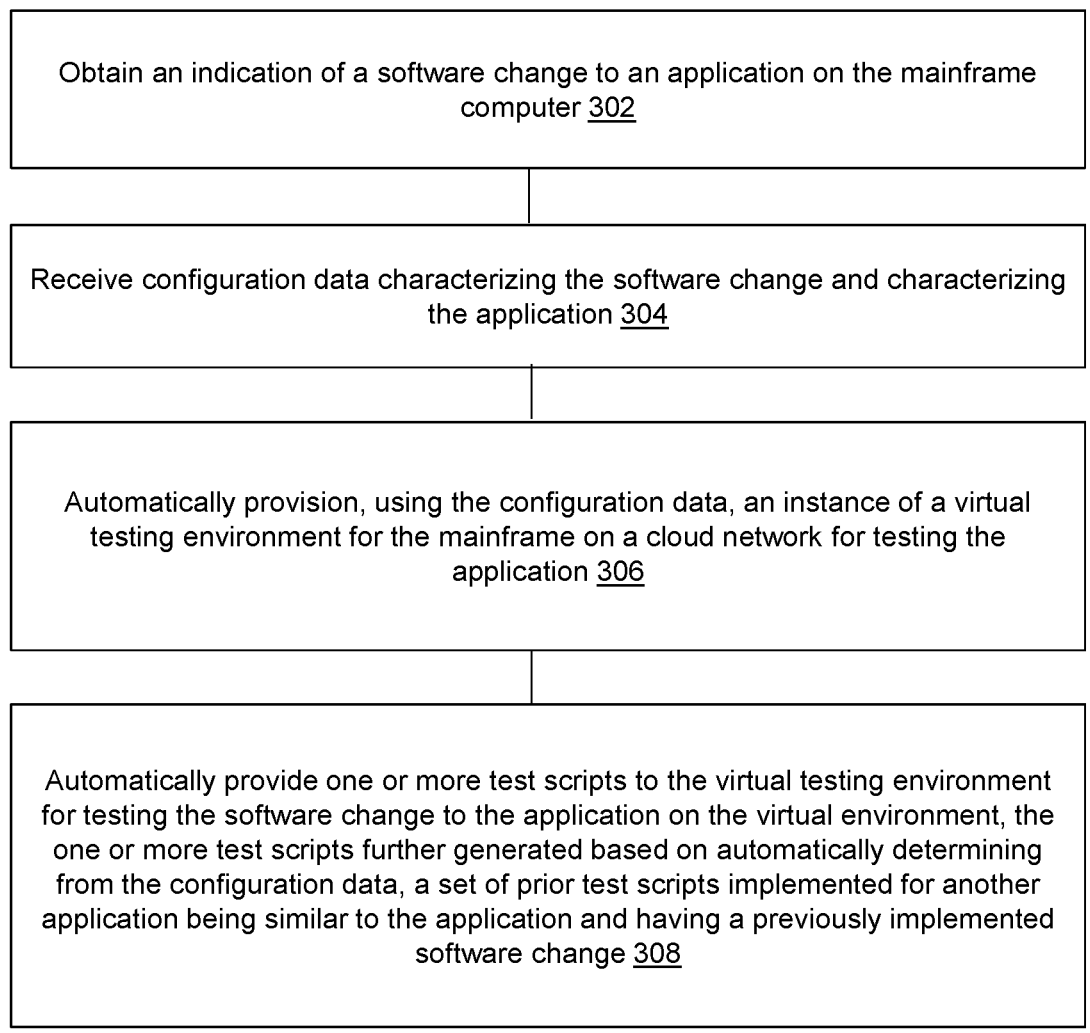
FIG. 3 is a flowchart illustrating an example operation of the testing manager server of FIG. 2, in accordance with one or more disclosed embodiments.

FIG. 3 is a flowchart illustrating example operations 300 of a computing device, namely the testing manager server(s) 106 of FIG. 1 in accordance with one or more aspects of the present disclosure. At 302 operations obtain as input (e.g. from a user computing device 102 and/or directly from the mainframe platform 110), an indication of a software change to an application 112 on a mainframe computer, e.g. mainframe platform 110 (which may be executing z/OS operating system). For example, testing manger server 106 may be configured, in some aspects, to automatically discover new native mainframe applications 112 on the mainframe platform 110 and invoke such applications via an API. The discovery of new native mainframe applications 112 on the mainframe platform 110 may be used as an indication at step 302, in some aspects, for performing testing on the new native applications 112. At 304, in response to the indication, the operations request and receive as input, from the mainframe platform 110, configuration data 128. The configuration data 128 characterizes the software change for the application and identifies/characterizes the application(s) 112 (e.g. 112A) having the software change (e.g. identifying the application affected, indicating related tangential applications which may also be involved in the software change, indicating the type of software change, indicating the expected functionality of the application and/or software change . . . ).

At 306, operations automatically provision, using the configuration data, at least one instance of a virtualized testing environment 118 for the mainframe on a cloud network for testing the application. Generating the instance may include generating instances of the virtual applications under test 120 (e.g. in some aspects including related applications), the virtual test execution environment 122 and/or data required for the virtual applications as stored in virtual mainframe database 126.

At 308, operations automatically generate and/or provide one or more test scripts 124 to the virtualized testing environment 118 for testing the software change to the application on the virtualized testing environment 118, the one or more test scripts 124 further generated based on automatically determining from the configuration data 128, a set of prior test scripts (e.g. other prior scripts) implemented for another application being similar to the application (e.g. as determined by a machine learning and classification module) and having a previously implemented software change which has been tested. Accordingly, such automated creation of the test scripts 124 generated using features derived from test scripts for other similar applications previously tested, saves users from creating test plans and scripts manually.

Accordingly, the disclosed system and method allows automatic generation of test scripts 124 for use in a virtual testing environment, resulting in efficient and automated review of test results (e.g. as provided by test results comparison module 218) and quick identification of potential problems in the test results. The disclosed system and method also allow virtual dynamic testing of a mainframe application 112 without requiring details of the mainframe application directly from a user, such as provided via manual input and testing.

It will be appreciated that in one aspect the teachings herein provide a method implemented by at least one processing device coupled to a memory and coupled to an I/O device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a wired or wireless technology, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

Other embodiments will be apparent to those skilled in the art from consideration of the specification and practice of the embodiments disclosed herein. The scope of the claims should not be limited by the embodiments set forth in the examples, but should be given the broadest interpretation consistent with the description as a whole.

What is claimed is:

1. A testing manager computing device for providing a virtual development and test environment for testing a mainframe computer, comprising:
 a storage device storing instructions; and
 at least one processor in communication with the storage device and configured to execute the instructions to:

obtain an indication of a software change to an application on the mainframe computer;

receive a request in response to the indication of the software change, from a requesting device, for testing the software change;

in response to the request:

receive, from the mainframe computer, configuration data characterizing the software change and characterizing the application including configuration data from each relevant application of the mainframe computer affected by the software change for subsequent testing;

automatically provision, using the configuration data, an instance of a virtual testing environment for the mainframe on a cloud network for testing the application; and based on the configuration data characterizing the software change, the application and said each relevant application, automatically generate and provide one or more test scripts to the virtual testing environment for testing the software change to the application on the virtual environment, the one or more test scripts further generated based on automatically determining from the configuration data a set of prior test scripts implemented for another application similar to the application and having a previously implemented software change.

2. The computing device of claim 1, wherein the configuration data comprises: metadata characterizing the application and related applications affected by the software change.

3. The computing device of claim 2, wherein the at least one processor is further configured to execute the instructions to receive, from the virtual testing environment, input indicating an update to the test scripts and automatically update test scripts for the application and the related applications affected by the software change.

4. The computing device of claim 2, wherein the at least one processor is further configured to:

based on the configuration data, determine the related applications and a mainframe database affected by the software change and automatically provision the virtual testing environment to automatically provide virtual cloud-based instances of each of the application, the related applications affected by the software change and the mainframe database.

5. The computing device of claim 4, wherein the related applications comprise applications which send or receive data to the application having the software change.

6. The computing device of claim 5, wherein the test scripts are further configured to validate the application and the related applications interacting with the application for functionality of the software change being in compliance with pre-defined requirements.

7. The computing device of claim 5, wherein the test scripts are further configured to retrieve data from the mainframe computer affected by the software change and to validate that a layout and data storage of retrieved data is in compliance with pre-defined requirements.

8. The computing device of claim 5, wherein the at least one processor is further configured to execute the instructions to request and receive, from the mainframe, one or more of mainframe security and network security standards, and wherein the one or more test scripts are further automatically generated to test whether the software change complies with the mainframe security and network security standards.

9. The computing device of claim 1, wherein the at least one processor is further configured to execute the instructions to generate the one or more test scripts based on performing a prediction algorithm to classify the application having the software change as being similar to the another application.

10. The computing device of claim 1, wherein the at least one processor is further configured to execute the instructions to request and receive, from the mainframe, compliance standards for testing the software change, and wherein the test scripts are further generated to test whether the software change complies with the compliance standards.

11. The computing device of claim 1, wherein the at least one processor is further configured to:

identify an intended use of the indicated software change by the mainframe computer;

initiate performing said testing of the application having the software change on the virtual testing environment;

receive from the mainframe computer at least one permissioning and compliance policy and convey to the virtual testing environment to include in the test scripts for the testing;

receive an indication from the virtual testing environment whether the testing indicates the intended use is inconsistent with the at least one permissioning or compliance policy; and transmit the indication to the mainframe computer for preventing the software change to be executed or recommend further changes if inconsistent.

12. A computer-implemented method for provisioning a virtual development and test environment for testing a mainframe computer, comprising:

obtaining an indication of a software change to an application on the mainframe computer;

receiving a request, from a requesting device, for testing the software change in response to the indication of the software change;

in response to the request:

receiving, from the mainframe computer, configuration data characterizing the software change and characterizing the application including configuration data from each relevant application of the mainframe computer affected by the software change for subsequent testing;

automatically provisioning, using the configuration data, an instance of a virtual testing environment for the mainframe on a cloud network for testing the application; and based on the configuration data characterizing the software change, the application and said each relevant application, automatically generating and providing one or more test scripts to the virtual testing environment for testing the software change to the application on the virtual environment, the one or more test scripts further generated based on automatically determining from the configuration data a set of prior test scripts implemented for another application similar to the application and having a previously implemented software change.

13. The method of claim 12, wherein the configuration data comprises: metadata characterizing the application and related applications affected by the software change.

14. The method of claim 13, further comprising: receiving, from the virtual testing environment, input indicating an update to the test scripts and automatically updating test scripts for the application and the related applications affected by the software change.

15. The method of claim 13, further comprising:
based on the configuration data, determining the related applications and a mainframe database affected by the software change and automatically provisioning the virtual testing environment to automatically provide virtual cloud-based instances of each of the application, the related applications affected by the software change and the mainframe database.

16. The method of claim 15, wherein the related applications comprise applications which send or receive data to the application having the software change.

17. The method of claim 16, wherein the test scripts are further configured to validate the application and the related applications interacting with the application for functionality of the software change being in compliance with pre-defined requirements.

18. The method of claim 16, further comprising receiving, from the mainframe, one or more of mainframe security and network security standards, and wherein the one or more test scripts are further automatically generated to test whether the software change complies with the mainframe security and network security standards.

19. The method of claim 12, further comprising:
identifying an intended use of the indicated software change by the mainframe computer;
initiating performing said testing of the application having the software change on the virtual testing environment;
receiving from the mainframe computer at least one permissioning or compliance policy and convey to the virtual testing environment to include in the test scripts for the testing;
receiving an indication from the virtual testing environment whether the testing indicates the intended use is inconsistent with the at least one permissioning or compliance policy; and
transmitting the indication to the mainframe computer for preventing the software change to be executed or recommend further changes if inconsistent.

20. A non-transitory computer readable medium storing instructions data for provisioning a virtual development and test environment for virtual testing a mainframe computer, which when executed by a processor of a computing device, the processor coupled to a memory and to a input/output (I/O) device, configure the computing device to:
obtain an indication of a software change to an application on the mainframe computer;
receive a request in response to the indication of the software change, from a requesting device, for testing the software change;
in response to the request:
receive, from the mainframe computer, configuration data characterizing the software change and characterizing the application including configuration data from each relevant application of the mainframe computer affected by the software change for subsequent testing;
automatically provision, using the configuration data, an instance of a virtual testing environment for the mainframe on a cloud network for testing the application; and
based on the configuration data characterizing the software change, the application and said each relevant application, automatically generate and provide one or more test scripts to the virtual testing environment for testing the software change to the application on the virtual environment, the one or more test scripts further generated based on automatically determining from the configuration data a set of prior test scripts implemented for another application similar to the application and having a previously implemented software change.

* * * * *